March 1, 1966  M. E. HINES  3,238,528
ELECTRIC WAVE PHASE CONTROL SYSTEMS
Filed Feb. 19, 1963  8 Sheets-Sheet 1

INVENTOR.
MARION E. HINES
BY Rosen & Schiller
ATTORNEYS

ILLUSTRATION OF PHASE SHIFT
MULTIPLICATION IN A HARMONIC GENERATOR

INVENTOR.
MARION E. HINES

INVENTOR.
MARION E. HINES
BY Rosen & Schiller
ATTORNEYS

United States Patent Office 3,238,528
Patented Mar. 1, 1966

3,238,528
ELECTRIC WAVE PHASE CONTROL SYSTEMS
Marion E. Hines, Weston, Mass., assignor to Microwave Associates, Inc., Burlington, Mass., a corporation of Delaware
Filed Feb. 19, 1963, Ser. No. 259,634
17 Claims. (Cl. 343—100)

This invention relates in general to electric wave phase control systems, and more particularly to novel combinations of phase shifters with frequency multipliers, and to electronically steerable directional antenna arrays employing the same at elevated frequencies.

Electric wave phase shifters are known for use in a variety of electrical circuits and systems, at a variety of frequencies including the so-called microwave frequencies. One of the known uses for phasing networks is in directional antenna arrays, particularly in high-gain and narrow-beam steerable antennas in the communications as well as the radar field. See, for example, the article entitled "Survey of Electronically Scanned Antennas," published in the "Microwave Journal," Volume 3, No. 12, December 1960, pages 67–72, and Volume 4, No. 1, January 1961, pages 57–64, particularly Part VI, "The Phase Shifter Antenna," in this article. Many schemes have been evolved using phase shifters for slewing the directivity of such antennas, but, as far as I am aware, such schemes are all limited to a phase difference between adjacent members of the array which is identical to the phase shift capability of the phase shifters employed.

It is an object of the present invention to provide a novel phase control system in which the phase shift available from a phase shifter is multiplied. Another object is to provide an electronically steerable directional antenna array employing phase shifters in which the effective phase shift in the array of each phase shifter is multiplied.

The invention employs frequency multipliers, preferably in the form of harmonic generator signal sources. These devices have the characteristic that a given shift in the phase of the input frequency is multiplied by the same amount as the frequency. Thus, if the device is a frequency quadrupler, a 10° phase shift of the input frequency $f_1$ will result in a 40° phase shift of the output frequency $4f_1$. In practicing the invention, a relatively low-frequency signal is passed successively through a phase shifter and a frequency multiplier, to achieve a signal at an elevated frequency the phase of which can be shifted a large amount in response to a small phase shift of the input signal. In particular, means are provided controllably to shift the phase of a high frequency signal over a wide range of phase parameters in response to a smaller phase shift of a lower frequency signal. For example, it is desirable to employ a high-frequency (e.g., microwave) signal translating system incorporating phase shifters in which the signal generators and/or the phase shifters are all designed for operation at relatively lower (e.g., VHF) frequencies.

According to a particular realization of the invention, a relatively low-frequency first signal is provided to at least two circuit branches in parallel, each branch having in series a phase shifter, a frequency multiplier and an antenna, and the phase shifters are controlled to provide a relatively small first difference in the phase of the first signal from one branch to the next, to achieve an antenna array responsive directly to second signals at a harmonic of the first signal frequency and an effective phase difference between the successive antennae which is greater than the first phase difference by an integral amount equal to the number of the harmonic of the first signal. It is accordingly another object of the invention to provide an electronically steerable directional antenna array employing low frequency signal oscillator source means with small phase shifts at low frequency and means to multiply both the frequency and the phase as presented at low frequency to provide a higher frequency array exhibiting directivity variability which is characteristic of larger phase shifts at the higher frequency. Another object is to provide methods and simple means controllably to alter the phase shift of each separate phase shifter in such arrays to steer the directivity of the array for scanning, tracking, communication, or other purposes.

A general object of the invention is to achieve the foregoing objects and features with systems and components which as far as possible at the present state of the art are all of the solid-state type. To this end it is contemplated to employ crystal controlled transistor oscillators, or the like, as signal sources at relatively low frequencies (e.g., 60 mc./sec.), and solid state phase shifters comprising semiconductor devices (e.g., varactor diodes), and/or saturable inductors (e.g., ferrites), preferably in circuits the phase shift characteristic of which can be controlled by the application of a bias voltage and/or current, as well as solid state frequency multipliers, such as harmonic generator circuits employing nonlinear impedance devices to generate a higher frequency signal as a harmonic of a relatively low frequency signal.

Thus, in one embodiment, the invention contemplates an electric wave frequency control system comprising means to provide a plurality of individual antenna units arrayed to have directivity in at least one plane, a separate chain comprised essentially of electric wave phase shifter means followed by an electric wave frequency multiplier coupled via the multiplier output to each antenna unit, each of said phase shifter means being controllable to provide that an electric wave presented to it will be presented to the following multiplier shifted in phase by a prescribed amount in accordance with a parameter of a control signal provided to said phase shifter means, means to provide an electric wave at a first frequency to each of said phase shifter means, each multiplier being adapted to provide at its output an electric wave at the $n$th harmonic frequency of said first frequency, where "$n$" is an integer, with a phase shift which is $n$ times the phase shift of said first frequency wave due to the phase shifter means preceding it in its chain, means to provide to said phase shifter means control signals which determine the directivity of said antenna array, and means to vary said signals to scan said directivity through said plane. Such an array may be employed to receive signals or to transmit signals, as will hereinafter appear, and the invention contemplates methods and means to effectuate each of these uses.

The invention will now be described with reference to the accompanying drawings, wherein.

Figure 2:
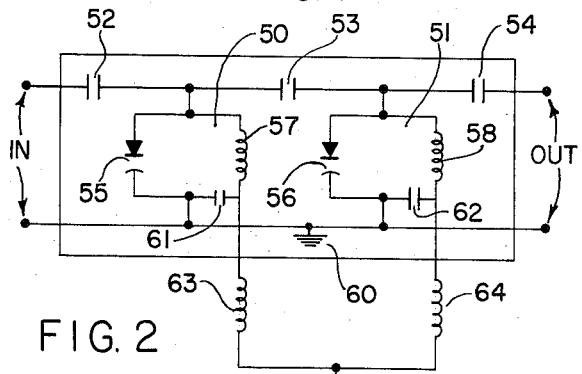
FIG. 2 illustrates a solid-state phase shifter.
Figure 3:
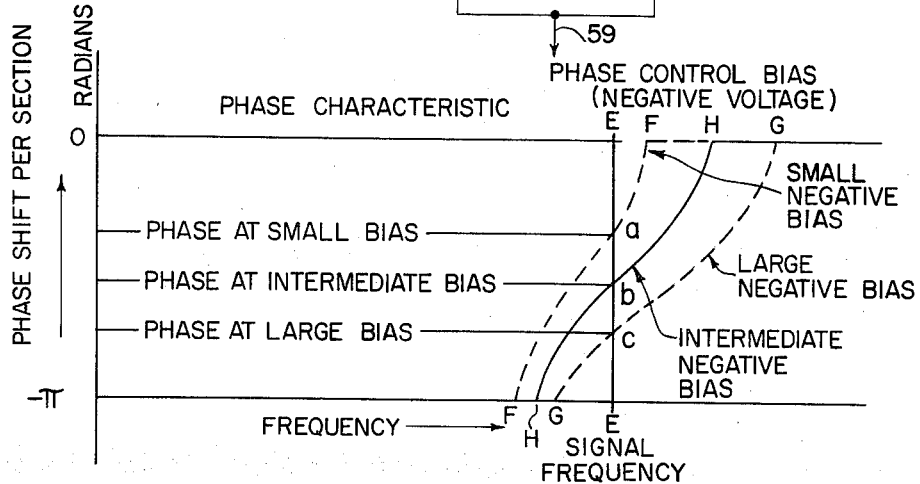
Figure 4:
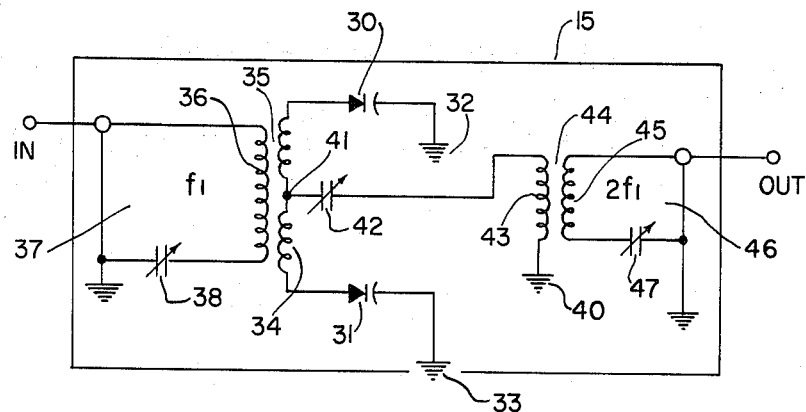
Figure 5:
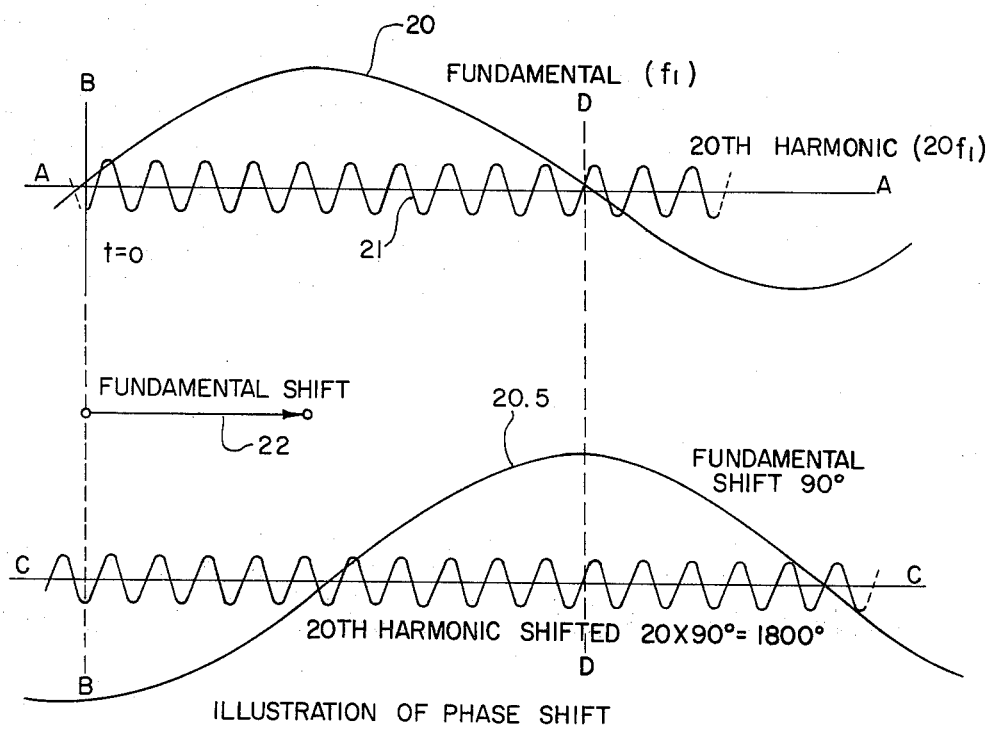
Figure 6A:
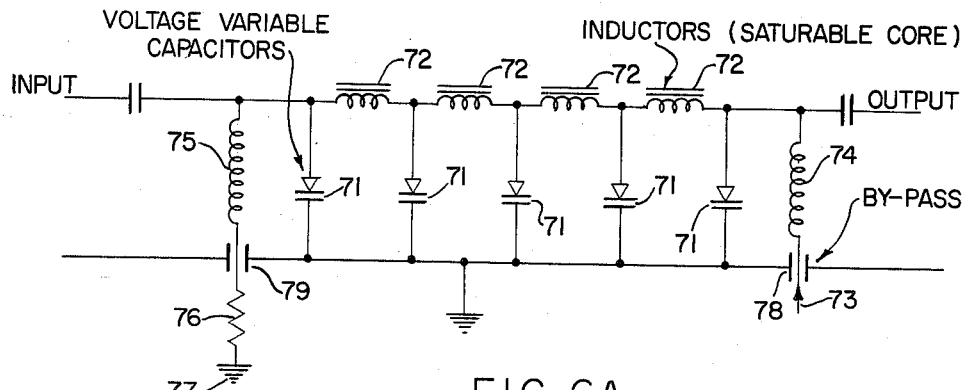
Figures 7, 7A:
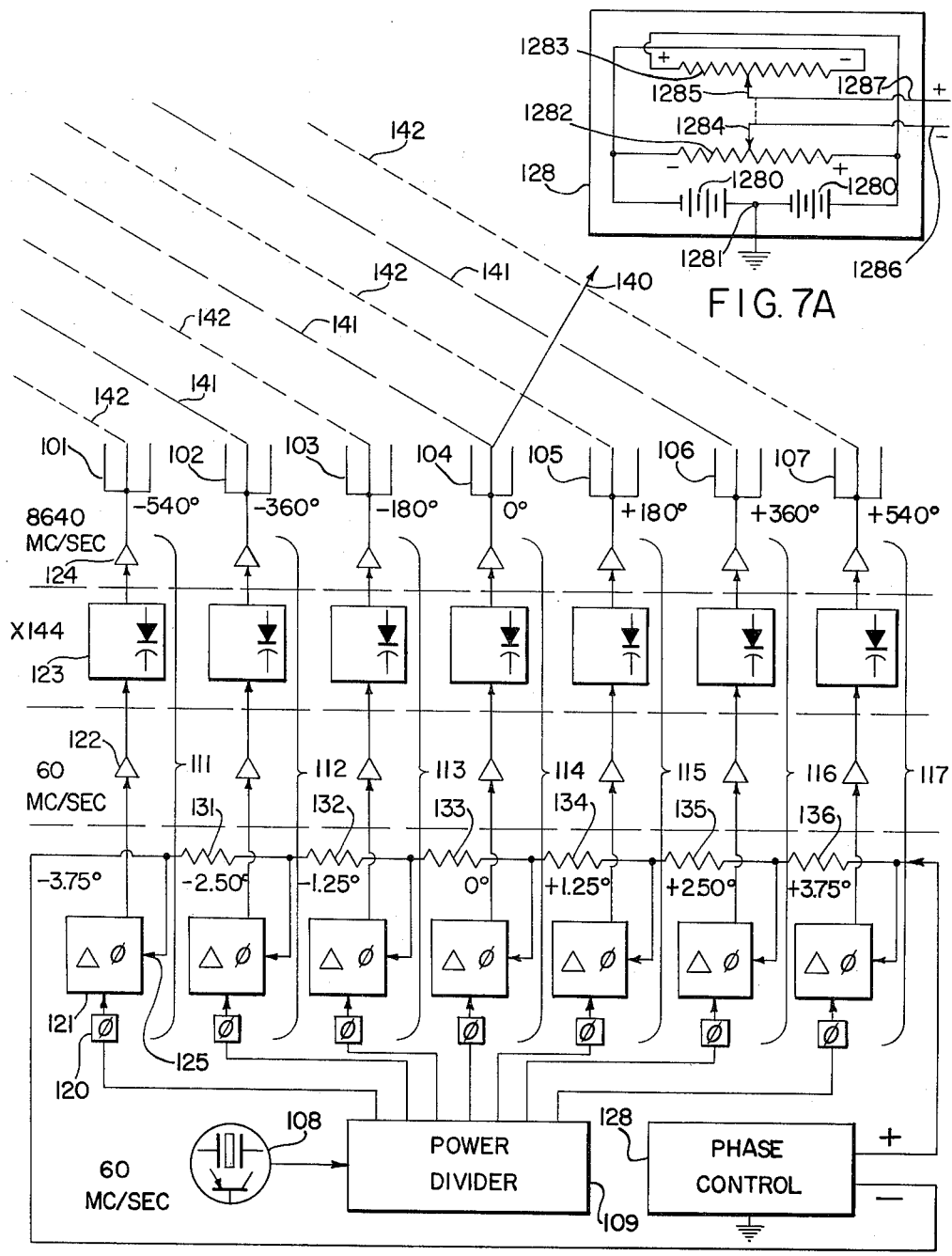
Figure 8:
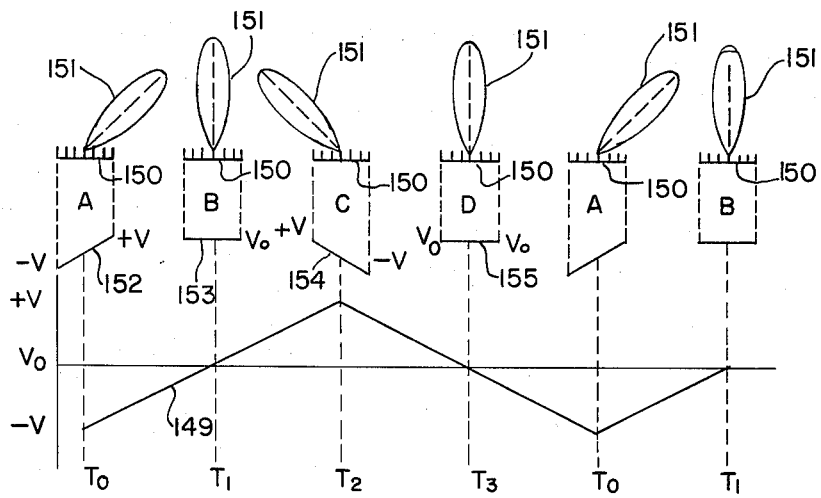
Figure 9:
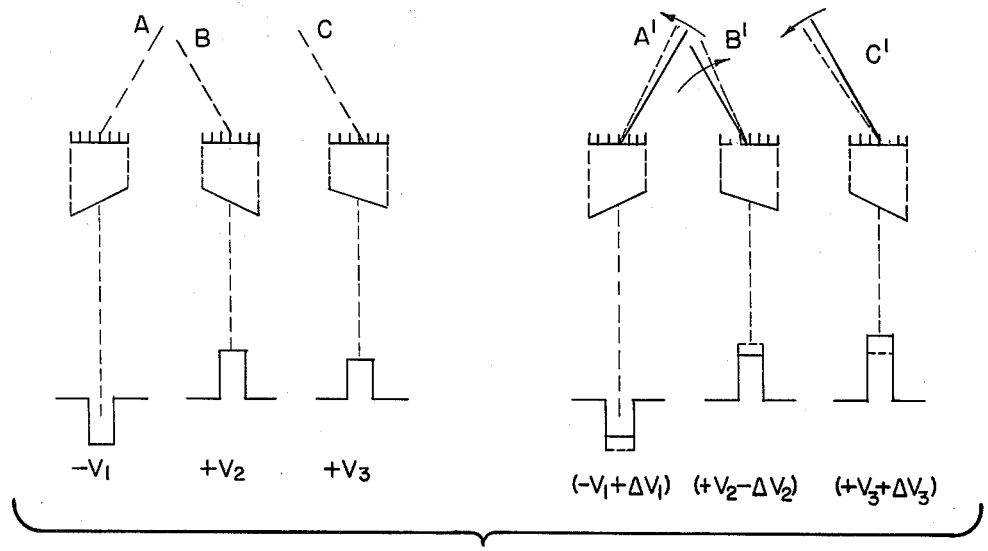
Figure 10:
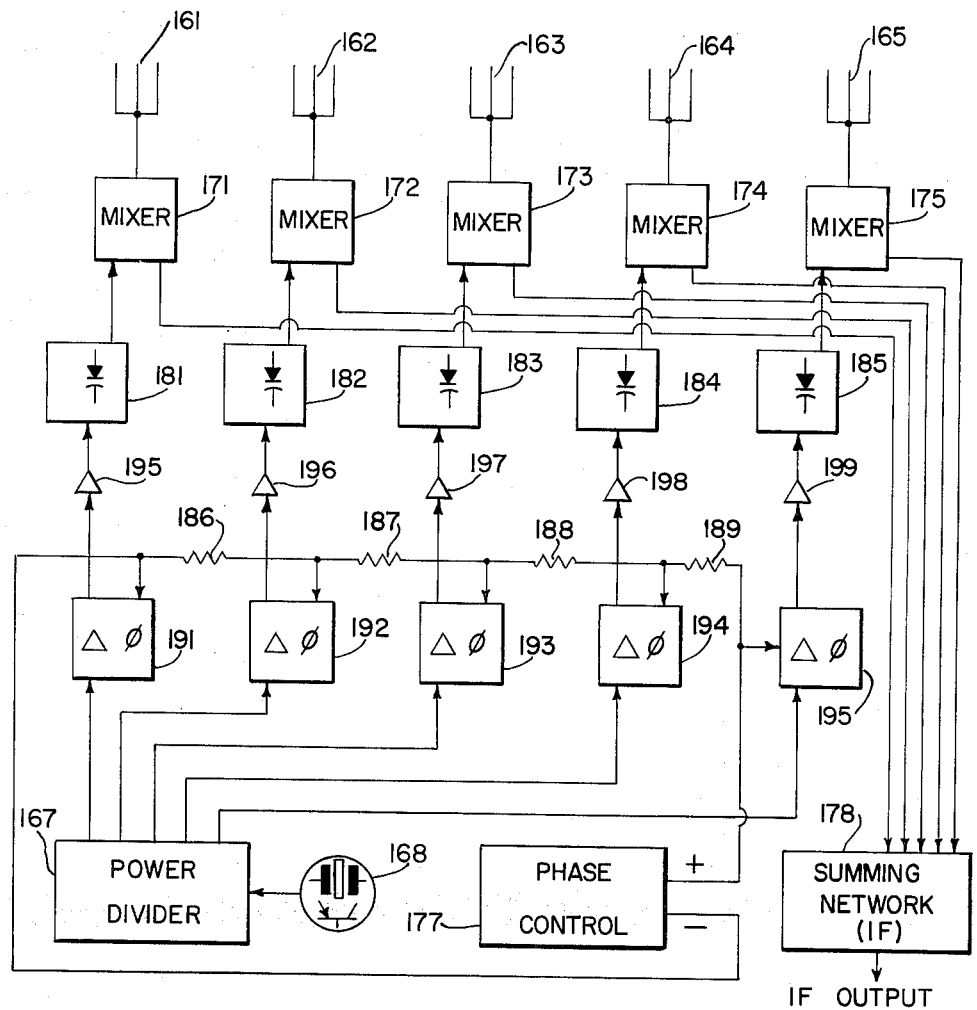
Figure 11A:
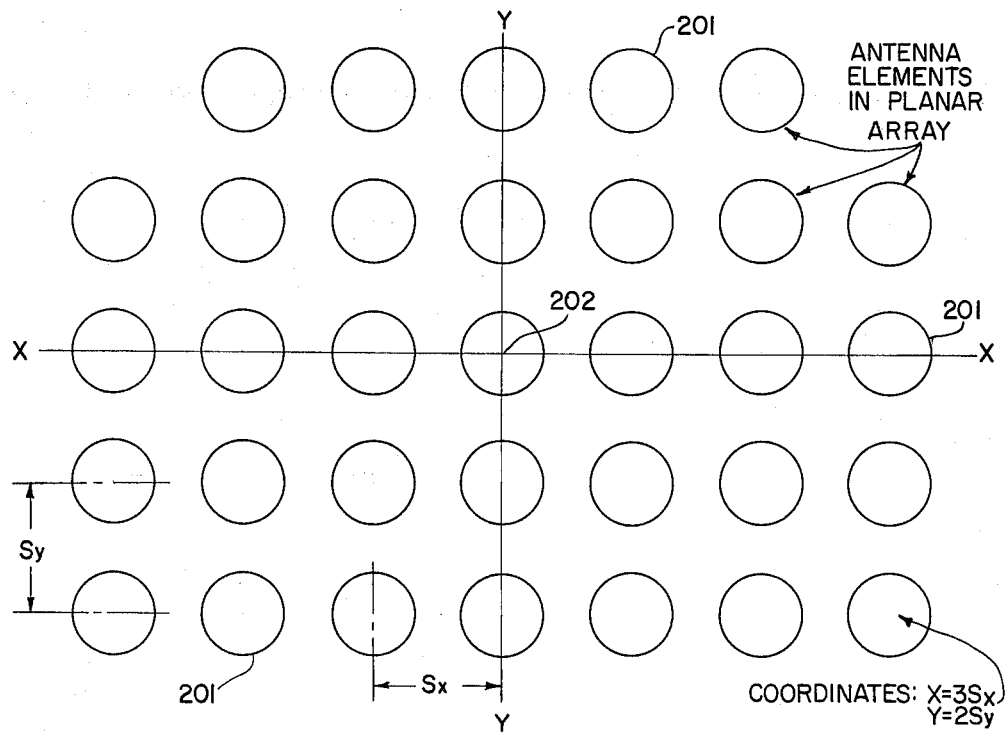
Figure 12:
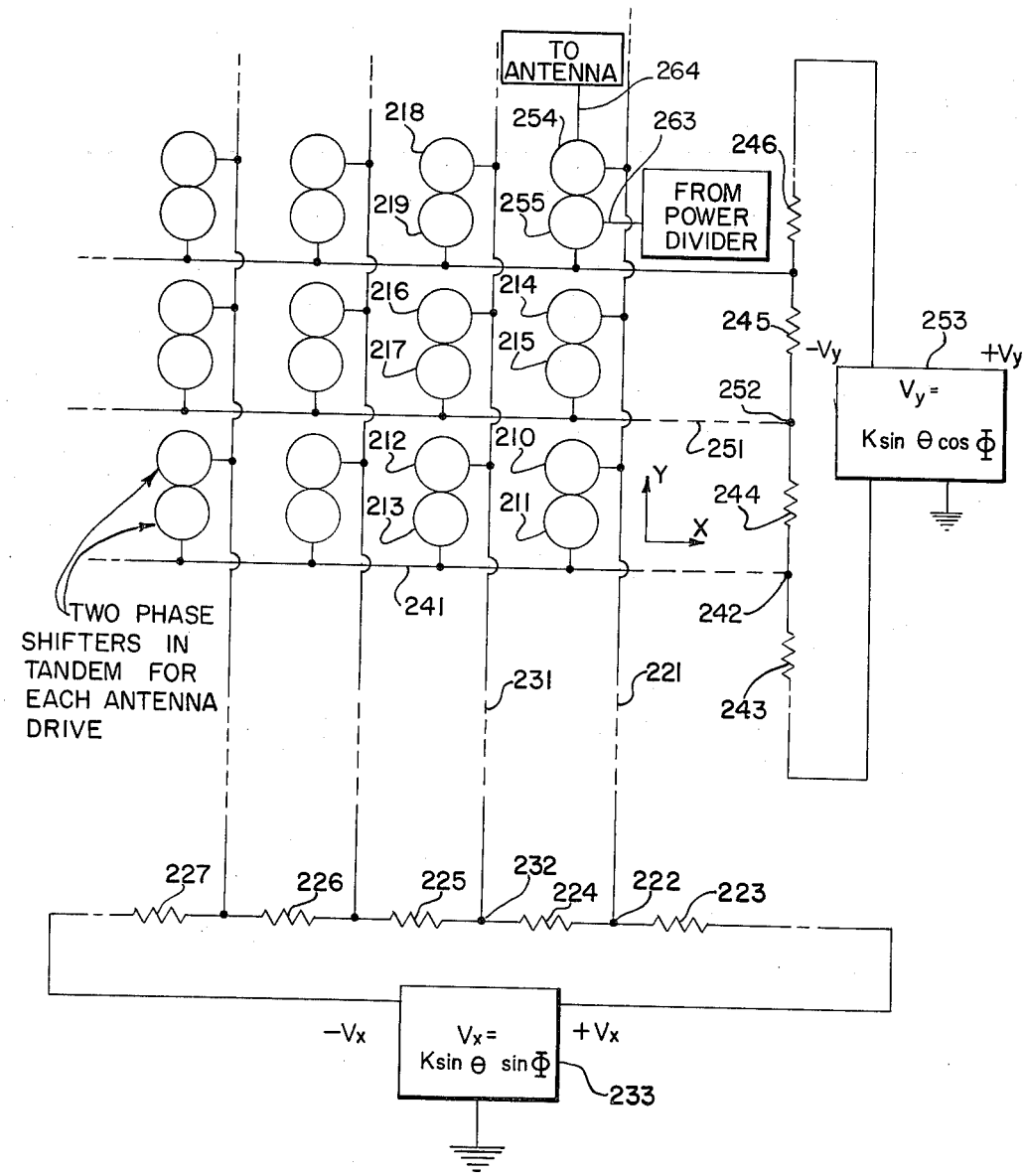

FIG. 3 graphically illustrates the phase characteristic of the phase shifter of FIG. 2;

FIG. 4 illustrates a solid-state harmonic generator suitable for use in the invention;

FIG. 5 graphically illustrates phase shift multiplication in a harmonic generator;

FIGS. 6A, B and C illustrate, respectively, the circuit diagram of a low-pass solid state phase shifter, in graphical form the characteristics of the variable elements in the circuit diagram, and in graphical form the phase characteristic of this phase shifter;

FIG. 7 schematically illustrates an electronically steerable directional antenna array according to the invention for transmitting high frequency signals;

FIG. 7A illustrates a component of FIG. 7;

FIG. 8 illustrates diagrammatically a method of employing the array of FIG. 7 for scanning;

FIG. 9 illustrates diagrammatically a method of employing the array of FIG. 7 for tracking;

FIG. 10 illustrates diagrammatically an electronically steerable directional antenna array according to the invention for receiving high frequency signals;

FIGS. 11A and B illustrate diagrammatically the arrangement and utility of a two-directional antenna array; and FIG. 12 illustrates an application of the invention to providing a two-dimensional electronically steerable directional antenna array according to the invention.

Figure 1:
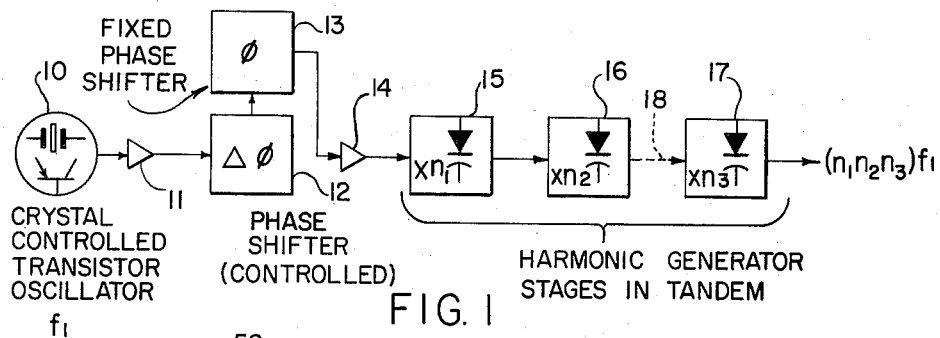
FIG. 1 illustrates a frequency and phase-shift multiplier chain as employed in the invention.

Referring to FIG. 1, a crystal-controlled transistor oscillator 10, which is representative of any suitable, preferably all solid state signal source, provides a first signal at a first frequency $f_1$ such as 60 mc./sec. This signal is desirably amplified in an amplifier 11 and provided to a first controlled or controllable phase shifter 12, suitable examples of which will be described in connection with FIGS. 2, 3 and 6A, B and C. The signal at the first frequency $f_1$, with the variable or controllable phase shift imposed upon it in the first phase shifter is then passed to a second fixed-phase shifter 13, the purpose of which will be more fully described below, and thence to a second amplifier 14. From the second amplifier the signal at the first frequency $f_1$, but now shifted in phase by the total phase shift $\phi_T$ imposed upon it by the two phase shifters 12 and 13, is provided to a chain of harmonic generators 15, 16 and 17 in tandem. The dotted-line link 18 between the second and third harmonic generators 16 and 17 indicates that additional harmonic generator stages may be inserted if desired.

As shown in FIG. 1, the first harmonic generator 15 provides at its output the "$n_1$" harmonic of the frequency of the signal ($f_1$) supplied to its input, where "$n_1$" is an integer, and is therefore designated an "$Xn_1$" frequency multiplier. The second harmonic generator 16 is similarly designated an "$Xn_2$" frequency multiplier, where "$n_2$" is an integer, and the third harmonic generator 17 is designated an "$Xn_3$" frequency multiplier, where "$n_3$" is an integer. The output from the final harmonic generator stage is thus at a frequency $(n_1\ n_2\ n_3)\ f_1$. It will be recognized that for a frequency doubler stage $n=2$, while for a frequency tripler stage $n=3$, and for a frequency quadrupler stage $n=4$, and so forth. FIGURE 4, which illustrates a suitable all-solid-state second-harmonic generator type frequency doubler, will be described below for purposes of illustration. However, since the details of harmonic generators, or other types of frequency multipliers, per se, form no part of the present invention, no other such device is herein illustrated or described, it being understood that such devices, singly and in chains, exist in the art.

Assuming as has been stated that a total phase shift $\phi_T$ is imposed upon the first frequency $f_1$ by the two phase shifters 12 and 13, the total phase shift imposed upon the output frequency $(n_1\ n_2\ n_3)\ f_1$ of the system shown in FIG. 1 is $(n_1\ n_2\ n_3)\ \phi_T$. Thus, if the total frequency multiplication of the harmonic generator chain 15–16–17 is, for example, 144, then the total phase shift at the output is 144$\phi_T$. As an example, if $\phi_T$ is 1.25°, then the total output phase shift is 180° at the frequency 144$f_1$. Further, if the input frequency $f_1$ is 60 mc./sec., then the output frequency is 60×144=8640 mc./sec. Thus, a system according to FIG. 1 having these parameters will produce, from an input signal at 60 mc./sec. on which a total phase shift of 1.25° is imposed, an output signal at 8640 mc./sec. on which a total phase shift of 180° is imposed.

The relationship between phase shift multiplication and frequency multiplication in harmonic generators is illustrated in FIG. 5. In this figure a fundamental frequency $f_1$ is represented by a first wave 20 drawn on a first horizontal axis or abscissa A—A, and the twentieth harmonic thereof, 20$f_1$, is represented by a second wave 21 drawn on the same axis. A vertical axis, or ordinate B—B represents time $t=0$, or the time origin. If a phase shift $\phi=90°$ is imposed on the fundamental frequency, the fundamental wave will be shifted to a new position along the abscissa, an amount represented by the horizontal arrow 22 labelled "fundamental shift"; the new position is represented by the fundamental wave 20.5 on the lower abscissa C—C in FIG. 5. Referring to the vertical dashed line D—D drawn through the second intersection of both waves 20 and 21 on the upper abscissa A—A, it will be seen on the lower abscissa C—C that the 90° phase shift of the fundamental has shifted this point of intersection five full cycles of the 20th harmonic, or 5×360°=1800°. In other words, the 20th harmonic has undergone a phase shift of 20×90°=1800°. In general, a fixed time period is involved between a zero-crossing (i.e., abscissa crossing) of the fundamental and the nearest subsequent zero-crossing of the harmonic, so that a shift of $\theta°$ in the fundamental will involve a shift of $n\theta°$ in the $n$th harmonic. This characteristic of harmonic generators, namely, that phase shift multiplication is equal to frequency multiplication in them, is employed to advantage in the present invention.

The harmonic generator circuit of FIG. 4 which may represent, for example, the contents of block 15 in FIG. 1, is a frequency doubler employing first and second non-linear impedance diode means 30 and 31, respectively, which may be non-linear capacitance semiconductor diodes, or varactors. These diodes are connected in series opposition between ground terminals 32 and 33, respectively, and an inductor 34 is connected between them to one pair of like-polarity electrodes. The inductor 34 is the secondary winding of an input transformer 35, the primary winding 36 of which is in the input circuit 37 for the fundamental frequency $f_1$. The input circuit includes a variable tuning capacitor 38. An intermediate tap 41 on the inductor 34 is connected to ground 40 via a second variable tuning capacitor 42 and an inductor 43 to provide an output circuit loop for the second harmonic frequency $2f_1$. The tuning capacitor 42 is adjusted to resonate this loop with the second harmonic frequency. The inductor 43 is effectively the primary winding of an output transformer 44, the secondary winding 45 of which is in an output circuit 46. A third variable tuning capacitor 47 is provided in the output circuit to tune this circuit to the second harmonic frequency.

As has been stated, harmonic frequency generators for frequency multiplication are now available at many desirable multiplication ratios. FIG. 4 illustrates a frequency doubler. Frequency multipliers having higher ratios, and chains of frequency multipliers to provide a wide variety of frequency multiplication ratios, are disclosed and claimed, for example, in copending application Serial No. 227,341 filed by the present inventor and another. Generally speaking, frequency and phase multiplication ratios between 100 and 200 are common with devices of this type. As an example, to obtain 144-times multiplication, one may use two frequency quadruplers and two frequency triplers in tandem, in the order 4×3×4×3=144.

Phase shifters suitable for use in the present invention can be designed in a variety of ways. FIG. 2 illustrates one form which consists essentially of a band-pass filter, made of a series of shunt parallel-resonant circuits 50, 51 coupled together by series capacitors 52, 53, 54. Voltage-variable non-linear capacitance semiconductor diodes (varactors) 55, 56, respectively, are used as the shunt capacitors of the parallel-resonant circuits 50, 51, which include inductors 57, 58, respectively. Bias voltage for the diodes 55, 56 is provided to them in parallel via a common bias terminal 59 through the inductors 57, 58, which are by-passed to ground 60 with large by-pass capacitors 61, 62, respectively. Chokes 63, 64 are provided in the bias input lines to the inductors 57, 58, respectively. The bias voltage is negative relative to ground, in the configuration shown, and is applied to the diodes in the non-conductive direction. If the diodes be reversed in polarity, the bias voltage will be positive relative to ground. The diodes, in this function, act, respectively, as capacitors in which the capacitance may be varied electronically by varying the bias voltage.

FIG. 3 shows how the transmission band of the phase shifter of FIG. 2 is shifted as the bias on the diodes 55, 56 is changed. This figure represents the phase shift, in radians, per section 50, 51, as a function of frequency. The frequency is represented along the abscissa, and the phase shift along the ordinate. If the signal frequency is chosen so that it stays within the pass-band of the filter, the phase shift changes as the bias voltage on the diodes changes. The vertical line E—E represents such a signal frequency. When the bias voltage is small (level "a"), the pass-band is substantially as represented by the left-hand dashed line F—F. When the bias voltage is large (level "c"), the pass-band is substantially as represented by the right-hand dashed line G—G. The pass-band is substantially as represented by the intermediate solid line H—H for an intermediate value of the bias voltage (level "b"). As is mentioned above, the bias voltage is negative relative to ground in FIG. 2. It is apparent that with the signal frequency maintained at the value represented by the vertical line E—E, a given change in the magnitude of the negative bias (at 59 in FIG. 2) will impose a corresponding phase shift, per filter section 50, 51, on the signal. When the capacitance of the diode 55, 56 of each filter section 50, 51, respectively, is large, the pass-band of that section is shifted downward (F—F in FIG. 3) so that the signal frequency is nearer to the upper edge of the pass-band. When the diode capacitance is small, the pass-band per section is shifted upward (G—G), toward higher frequencies, and the signal is nearer the lower edge of this band. As the diode capacitance is increased, the phase shift increases in the positive direction.

FIG. 6A shows an alternative phase-shift configuration using a low-pass type of filter, employing both voltage-variable shunt capacitors 71 in the form of semiconductor diodes of the varactor type, and saturable core series inductors 72. This configuration takes advantage of the fact that ferrite or other cored inductors can be tuned by applying a controllable D.C. bias current which reduces the incremental inductance by saturating the core. A bias control circuit comprises a bias input terminal 73 in series with a first RF choke 74 to one end of the string of inductors 72, and from the other end of the string of inductors to a second RF choke 75, a bias control resistor 76 and ground at 77. By-pass capacitors 78 and 79 are provided, corresponding to the by-pass capacitors 61 and 62 in FIG. 2.

Figure 6B:
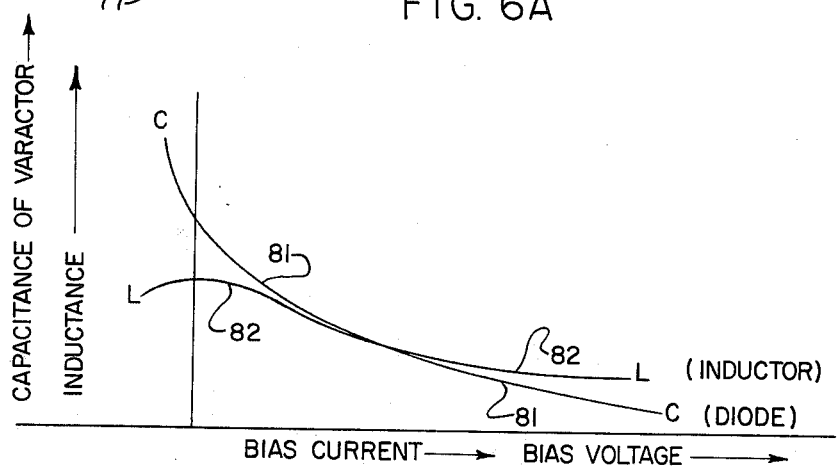

With this configuration, the capacitance and inductance can be varied simultaneously, so that the image impedance of the filter may be kept essentially constant during tuning. FIG. 6B illustrates the characteristics of the variable capacitor elements 71 and the variable inductor elements 72 as a function of bias voltage and bias current, respectively. It will be appreciated that a negative voltage (relative to ground at 77) is applied to bias control terminal 73 for both capacitance and current control. Curve 81 represents variations in the capacitance of each varactor 71 as a function of bias voltage, while curve 82 represents variations in the inductance of each inductor 72 as a function of bias current.

Figure 6C:
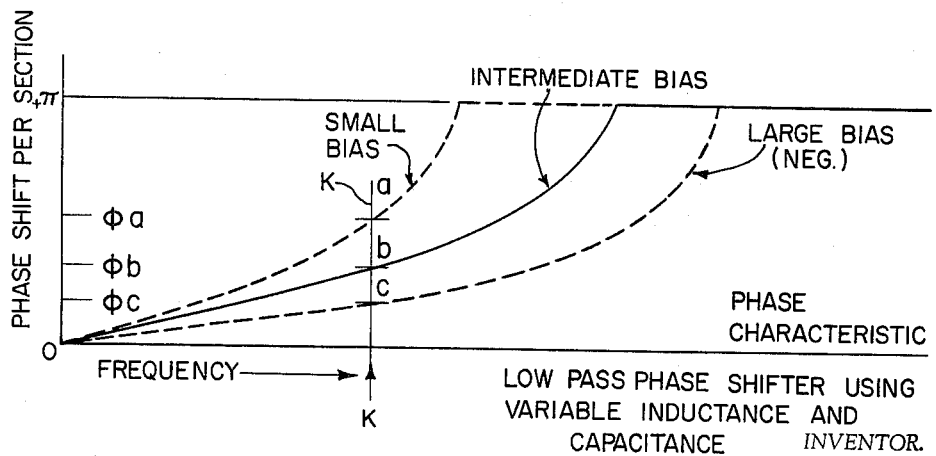

The phase characteristics of the configuration shown in FIG. 6A are illustrated in FIG. 6C, for different tuning conditions. This figure is substantially self-explanatory. As before, in connection with FIG. 3, if the signal frequency is held well within the pass-band for all practical conditions (e.g., centered at vertical line K—K) the phase shift will change as the reactive elements are varied, with little or no variation in amplitude.

Referring again to FIG. 1, the controlled phase shifter 12 and the fixed phase shifter 13 may each be made according to FIG. 2 or FIG. 6A, for example. The latter phase shifter 13 may, of course, be tuned with fixed bias controls. Alternatively, ordinary linear variable capacitors and inductors can be used, for the fixed phase shifter 13, to adjust the phase shift for the reference condition.

FIG. 7 shows an electronically steerable directional transmitting antenna array employing the principles of the present invention. As illustrated by way of example only, this array has seven uniformly spaced antenna elements 101, 102, 103, 104, 105, 106 and 107, respectively. All of the antenna elements are driven by a common primary oscillator source 108; preferably this is a stable oscillation generator; as illustrated it is a crystal-controlled transistor oscillator, and its frequency is fixed at 60 mc./sec. The output of the oscillator source 108 is fed to a power divider 109 and thence in parallel to each of seven frequency and phase-shift multiplier chains 111, 112, 113, 114, 115, 116 and 117, each of which terminates, respectively, at one of the antenna elements 101–107. Each of these chains is similar to FIG. 1, and they are all substantially identical in construction, so that a detailed description of the first chain 111 will suffice for all of them.

The first chain 111 comprises a fixed phase shifter 120 and a controllable phase shifter 121, which embody, respectively, the function of phase shifters 13 and 12 in FIG. 1, an amplifier 122 for the phase shifted 60 mc./sec. signal from the oscillator source 108, a frequency multiplier chain represented by a block 123 adapted to provide at its output the 144th harmonic of 60 mc./sec., namely an output at 8640 mc./sec., and an amplifier 124 for the 8640 mc./sec. signal energy which is coupled to the antenna element 101. The controllable phase shifter 121 has a bias signal input terminal 125, which corresponds to the bias input terminal 59 in FIG. 2, or 73 in FIG. 6A.

A phase control circuit represented by a block 128, exemplary contents of which are described below in connection with FIG. 7A, provides a bias voltage across a potential divider comprised of a series string of resistors 131, 132, 133, 134, 135 and 136. In the electrical condition depicted in FIG. 7, the voltage across this string of resistors is relatively more negative at the left-hand end, as seen in FIG. 7, than at the right-hand end; the junctions of adjacent pairs of resistors and of the end resistors in this string are respectively connected to the bias input terminals of the phase shifters as shown, and the phase shifters of each frequency and phase-shift multiplier chain are so adjusted that a phase shift of 0° is imposed on the 60 mc./sec. signal in the chain 114 for the center antenna element 104, a phase shift labelled "+1.25°" is imposed on the 60 mc./sec. signal for the chain 115 for the next adjacent antenna element 105 to the right thereof, and so forth to the right, the phase shift increasing in the "positive" direction by 1.25° from each antenna element chain 115, 116, to the next; and a phase shift labelled "−1.25°" is imposed on the 60 mc./sec. signal for the chain 113 for the next adjacent antenna element 103 to the left of the center element 104, and so forth to the left, the phase shift increasing in the "negative" direction by 1.25° from each antenna element chain 113, 112, to the next in the left-hand direction. Here, the label "+1.25°" represents 1.25° of phase delay, while the label "−1.25°" represents 1.25° of phase advance relative to 0° at the center element 104, so that the maximum phase advance occurs at the left-hand end of the antenna array, and the maximum phase delay occurs at the right-hand end of the array, as shown in FIG. 7.

Referring to FIG. 7A, the phase control 128 may comprise a battery 1280 grounded at its center 1281 connected across two resistors 1282 and 1283 in parallel. The resistors are disposed physically parallel to each other so that their voltage drops are in relatively opposite directions, and ganged potentiometer sliders 1284 and 1285, respectively, are provided to tap them and provide the desired bias voltage between two output lines 1286 and 1287, respectively. In order to assure that bias voltage of the proper polarity is at all times provided to each controllable phase shifter, a fixed bias source (not shown) may be incorporated either in the phase control 128, or in series with it.

The fixed phase shifters 120 are useful to adjust the antenna elements 101–107, inclusive, to equal-phase output when the bias voltage is the same at all the controllable phase shifter 121, that is, when the directivity is normal to the array.

As will be recalled from the foregoing discussion with reference to FIG. 1, a phase shift of 1.25° at 60 mc./sec. results in a phase shift of 180° at 8640 mc./sec. Accordingly, the relative phase differences between the signals at 8640 mc./sec. presented to the antenna elements 101–107 respectively, are −540°, −360°, −180°, 0°, +180°, +360° and +540°, as shown in FIG. 7. In this condition, the directivity of the antenna array is to the right, as indicated by the arrow 140; the long-dashed phase front lines 141 represent peaks of the antenna array wave front, and the short-dashed phase front lines 142 represent troughs thereof. Clearly, by providing a bias voltage across the resistor string 131–136, inclusive, the limits of which can be made to approach each other and reverse in polarity, periodically or in fixed increments, the antenna array of FIG. 7 can be made to scan, or to track, electronically. Such functions are illustrated and described below with reference to FIGS. 8 and 9.

It is also clear that the antenna array shown in FIG. 7 is exemplary only. Any number of antenna elements, for example, as many as 10,000 may be employed to form a directional array, and any corresponding number of frequency and phase-shift multiplier chains, all driven by a common relatively low frequency oscillator source subjected to only small phase shifts. The same principles as in FIG. 7 will apply, where, for example, there is shown a total of 1080° of antenna phase shift, end-to-end over seven antenna elements, or ±540° measuring from center, with a maximum of only 7.5° variation at the inputs to the multipliers, or ±3.75° from the center point.

FIG. 8 illustrates a sequence of instantaneous events in the scanning of the beam pattern 151, or directivity of the antenna array of FIG. 7. The array is represented by a comb-like structure 150. The beam pattern 151 is shown first in FIG. 8A as going to the right at time $T_0$, then in FIG. 8B as normal to the array at a later time $T_1$, then going to the left in FIG. 8C at time $T_2$, followed by return to normal in FIG. 8D at time $T_3$, and finally completing a scanning cycle by returning to the right in FIG. 8A (repeated) at time $T_0$ starting a new scanning cycle. The voltage across the bias resistors 131–136, inclusive, in FIG. 1 is shown as −V at the left-hand end in FIG. 8A, corresponding to a right-hand directed beam pattern 151. The voltage then approaches the case in which it is at $V_0$ through the entire resistor chain, corresponding to zero phase shift at each antenna element (relative to all the other antenna elements), and therefore to a normally-directed beam pattern (FIG. 8B). Continuing, the bias voltage reverses in polarity, to become +V at the left-hand end (in FIG. 7) of the bias resistor string 131–136, corresponding to a left-hand directed beam pattern 151. The zig-zag curve 149 in FIG. 8 illustrates the relative voltage change between −V and +V through $V_0$ at the left-hand end of the string of bias resistors 131–136 as the beam 151 is scanned, while the solid lines 152, 153, 154 and 155 at the bottom of FIGS. 8A, 8B, 8C and 8D, respectively, illustrate the voltage gradient across the bias resistors 131–136 for each instantaneous condition represented.

Thus by applying a constantly changing phase-control voltage gradient across the resistors 131–136 in series, the antenna array of FIG. 7 may be scanned in directivity. The circuit of FIG. 7A, for example, may be adapted to do this by applying a suitable driving motor (not shown) to the sliders 1284 and 1285.

By maintaining a particular phase control voltage across the string of resistors 131–136 (FIG. 7), the directivity of the antenna array may be fixed. FIG. 9 illustrates at A, B, and C three fixed phase control voltage gradients, which produce directivities as shown. The directivity is directed to the right in FIG. 9A, when the left-hand end of the resistor string 131–136 is at $-V_1$, to the left in FIG. 9B where the same end is at $+V_2$, and to the right but nearer to normal in FIG. 9C where the same end is at $+V_3$, which is smaller than $+V_2$. For tracking purposes, as for example in an automatic tracking radar system (not shown) having means to feed correcting or error voltages to a steerable antenna, the application of a correcting voltage $+\Delta V_1$ to case 9A will produce a change in directivity of the antenna array toward normal as shown in FIG. 9A. Similarly, the application of an error or correcting voltage $-\Delta V_2$ to $+V_2$ in case 9B will produce a change in directivity toward normal as shown in FIG. 9B. In the same manner, the application of an error or correcting voltage $+\Delta V_3$ to the phase control voltage gradient represented by $+V_3$ in case 9C will produce a change away from normal in the antenna array directivity, as shown in FIG. 9C. It will be apparent to those skilled in the art that the scan-control scheme depicted in FIG. 9 lends itself to simultaneous tracking of a plurality of moving objects with a single radar system employing an electronically-steerable antenna array according to the present invention.

FIG. 10 shows an antenna array arranged according to the invention for use as a receiving system. The principles of scanning control are the same as in FIGS. 7, 8 and 9. Five uniformly-spaced antenna elements 161, 162, 163, 164 and 165, respectively, are shown. A separate mixer 171, 172, 173, 174 and 175, respectively, is employed for each antenna element, and a separate harmonic generator 181, 182, 183, 184 and 185, respectively, to provide the "pump" or "local oscillation" wave for each mixer. Separate phase shifter means 191, 192, 193, 194 and 195, respectively (each of which may include the functions of a fixed phase shifter and a controllable phase shifter), are provided, each coupled at its input via a power divider 167 to a common primary oscillator source 168 (similar to the source 108 in FIG. 7), and at its output via an optional amplifier 195, 196, 197, 198 and 199, respectively, to one of the harmonic generators 181, 182, 183, 184 or 185, respectively. Phase control is applied to the controllable portion of each of the phase shifters in the same manner as shown in FIG. 7, from the phase control circuit represented by a block 177 over a series string of resistors 186, 187, 188 and 189. As in the case of a transmitter illustrated in FIG. 7, this is most advantageously done at the common low driving frequency for the harmonic generators, where a much smaller phase adjustment is needed.

Assuming that the primary oscillator source 168 produces a 60 mc./sec. signal, and the harmonic generators 181–185 produce ×144 frequency multiplication, a "local oscillator" signal at 8640 mc./sec. will be supplied to each of the mixers 171–175, respectively; the relative phases of these signals will be controlled by the phase control circuit 177 in the same manner as in FIG. 7. If the frequency of the received signal is 30 mc./sec. different from the "local oscillator" signal, an IF signal at 30 mc./sec. will appear at the output of each mixer, and will be fed to the summing network 178. The IF output signal from the summing network will be maximum for a received signal arriving at the antenna array from the direction corresponding to the directivity of the array as determined by the phase control 177. Clearly, the common oscillator source frequency and the multiplication ratio of the harmonic generators 181–185, inclusive, can be adjusted to provide a desired local oscillator frequency (e.g., 8610 mc./sec.) for the transmitted frequency (e.g., 8640 mc./sec.) emitted by the transmitting array of FIG. 7, to provide an IF frequency appropriate for a complete radar system (e.g., 30 mc./sec.).

It is well known that the phase of an IF signal from a mixer is given by the expression $$\phi_{IF} = \phi_{SIG} - \phi_{LO}$$

where:

$\phi_{IF}$ is the phase of the intermediate frequency wave;
$\phi_{SIG}$ is the phase of the signal; and
$\phi_{LO}$ is the phase of the local oscillator wave.

A signal will be strongly received if the IF waves from each mixer 181–185, inclusive, add in phase in the summing network 178. This requires that the local oscillator phase variations across the antenna array 161–165, inclusive, be equivalent to the received signal phase variations across the array. By establishing a particular linear variation of phase, one can, with the present invention, establish a uniform IF phase condition for incoming waves from a particular desired direction. Waves reaching the antenna array from other directions result in many IF waves which are not in uniform phase and therefore add as vectors of many directions. In general, such additions result in numerous cancellations and small net sums. In this manner, one may choose the direction for reception in FIG. 10 by establishing a proper phase pattern of the local oscillator waves at the various mixers 181–185, inclusive. Again, as in FIG. 7, the number of antenna elements and related components shown in FIG. 10 is exemplary only; a much greater number may be used, if desired.

It is thus far evident that the present invention provides an electronically steerable antenna array system in which the phase of many wave sources, and many receivers, may be controlled through very large angles in a simple continuous manner. The phase shifts are induced first at a lower frequency with a simple network using voltage variable capacitance semiconductor diodes (varactor diodes) and/or ferrite (or other cored) inductor elements, then multiplied to large values in a harmonic generator circuit. In the one-dimensional arrays shown in FIGS. 7 and 10, a linear phase variation is used across the array. Clearly, non-linear or non-uniform arrays, with non-uniform corresponding phase variations may also be used. The present invention also lends itself readily to the provision of electronically steerable two-dimensional antenna arrays, in which case it is evident that a linear or other suitable phase variation is needed along two dimensions, for example, two orthogonally-related directions. FIGS. 11 and 12 illustrate the application of the present invention to such a two-dimensional array.

Figure 11B:
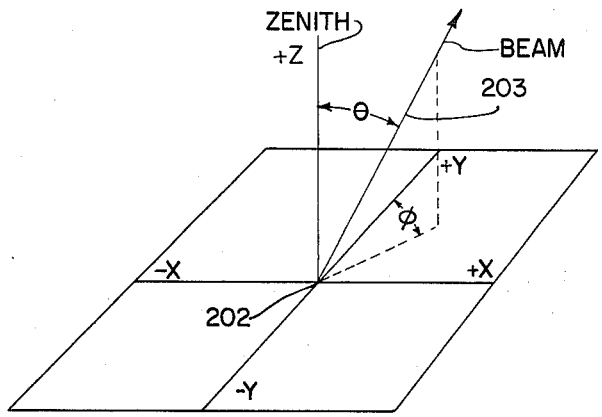

FIG. 11A illustrates an array of antenna elements, represented by circles 201, lying in a plane, spaced by equal increments Sx in the X-direction, and by Sy in the Y-direction. The origin is taken at the center 202 of the array at the intersection of the X-axis and the Y-axis as shown on the drawing. Referring to FIG. 11B, the plane of the array is shown including the rectangular coordinates −X to +X and −Y to +Y, and the zenith extends normally from the origin to +Z. An arbitrary beam direction 203 is shown at an angle $\theta$ with respect to the zenith line (elevation) and an angle $\phi$ with respect to the Y-axis (azimuth). The desired phase relationships are as follows for such a planar array:

$$\Delta\beta = \left(\frac{2\pi}{\lambda} \sin\theta \sin\phi\right)x + \left(\frac{2\pi}{\lambda} \sin\theta \cos\phi\right)y$$

where:

$\Delta\beta$ is the phase angle difference measured from the origin 202 of the array;

$x$ and $y$ are the orthogonal distance coordinates of any antenna element 201 in the planar array measured from the origin 202;

$\theta$ is the desired elevation angle of the beam 203 measured from the perpendicular;

$\phi$ is the azimuth beam angle measured from the y axis; and $\lambda$ is the free-space wavelength of the radiation involved.

The desired phase deviations are simple linear functions of the $x$ and $y$ coordinates of the antenna elements, and the coefficients in the above equation are simple trigonometric functions of the desired beam angles. To determine the desired beam direction, it is required to generate two trigonometric functions of the beam angles. These two functions may be combined in a simple additive manner which is linearly dependent upon the position of each element 201 in the array.

In the rectangular arrangement of elements shown in FIG. 11A, the antenna element 201 are arranged in rows along which $y$ is constant, and in columns along which $x$ is constant. The rows and columns may be equally spaced along their respective directions, but the $x$ spacing need not be the same as the $y$ spacing.

FIG. 12 illustrates a configuration of phase shifters which achieves a simple method of phase control for an array of antennas according to FIG. 11A. FIG. 12 is schematic and shows only a small group of controllable phase shifters and their bias control voltage sources and resistor strings. Each antenna element is provided with two controllable phase shifters in tandem; (preferably a fixed phase shifter (not shown) is also provided for each antenna element for adjusting purposes as described above with reference to FIG. 7). Thus first and second controllable phase shifters 210 and 211 are provided for one antenna element, first and second controllable phase shifters 212 and 213 are provided for the next adjacent antenna element in the x-direction, first and second controllable phase shifters 214 and 215 are provided for the next adjacent antenna element in the y-direction, first and second controllable phase shifters 254 and 255 are provided for the second next adjacent antenna element in the y-direction, and so forth. The first controllable phase shifter in each pair (210, 212, 214, 216, 218, 254, etc.) provides the phase shift angle given by the first term on the right-hand side of the above-stated equation $$\left(\frac{2\pi}{\lambda} \sin\theta \sin\phi\right)$$

and the second controllable phase shifter of each pair (211, 213, 215, 217, 219, 255, etc.) provides the phase shift angle given by the second term $$\left(\frac{2\pi}{\lambda} \sin\theta \cos\phi\right)$$

For any column of antenna elements for which $x$ is constant, the first controllable phase shift elements (e.g., 210, 214, 254, etc.) will be equally adjusted; thus these phase shift elements are connected by a common line 221 to a junction 222 between two resistors 223 and 224 of the x-coordinate phase control voltage resistor string 223, 224, 225, 226, 227, etc. Likewise, the first controllable phase shift elements 212, 216, 218, etc., for the next adjacent column for which $x$ is constant are connected by a common line 231 to the junction 232 between the next successive pair of resistors 224 and 225 in this resistor string. Arrangement is similar for succeeding colums for which $x$ is constant. The x-coordinate phase control voltage source represented by a block 233 provides a x-coordinate phase shift voltage having the form $V_x = K \sin\theta \sin\phi$, where K is constant which includes the factor $2\pi/\lambda$ of the above-stated equation, and an additional factor to account for the sensitivity of the phase shifters with respect to voltage changes, as is more particularly explained below.

In a similar manner, for any row of antenna elements for which $y$ is constant, the second controllable phase shift elements 211 and 213, etc., or 215, 217, or 255, 219, etc., will be equally adjusted. Thus, for the left-most row, as seen from the right-hand side of FIG. 12, all the second controllable phase shifters 211, 213, etc., of this row are connected by a common line 241 to the junction 242 between two resistors 243 and 244 of the $y$-coordinate phase control resistor string 243, 244, 245, 246, etc. Likewise, the second controllable phase shift elements 215, 217, etc., for the next adjacent row for which $y$ is a constant are connected by a common line 251 to the junction 252 between the next successive pair of resistors 244, 245 in the $y$-coordinate resistor string. The arrangement is similar for succeeding rows for which $y$ is constant. The $y$-coordinate phase control voltage source represented by a block 253 provides a $y$-coordinate phase shift voltage having the form $V_Y = K \sin \theta \cos \phi$, where K is a constant including the factor $2\pi/\lambda$ whose value is derived below.

Thus, with the arrangement according to FIG. 12, one can adjust all of the first controllable phase shifters on any column ($x$-coordinate) simultaneously with a first common control voltage, and at the same time independently adjust all of the second controllable phase shifters in any row ($y$-coordinate) simultaneously with a second common control voltage. For evenly spaced arrays as shown in FIG. 12, the phase shift for each controllable phase-shift section changes in equal increments from column to column, or from row to row. If it be assumed that the controllable phase shifters are controlled by voltage and are linear, then equal voltage increments are provided from row to row ($y$-coordinate) or from column to column ($x$-coordinate). Such equal voltage increments are easily obtained from a simple series of equal voltage dropping resistors, 243–246, etc., and 223–227, etc., respectively. Then, according to the foregoing equation, the phase shift difference between controllable phase shift elements in the $x$ and $y$ directions, respectively, should be:

$$\Delta \beta_x = \frac{2\pi Sx}{\lambda} \sin \theta \sin \phi$$

and $$\Delta \beta_y = \frac{2\pi Sy}{\lambda} \sin \theta \cos \phi$$

If the phase-shift sensitivity of each controllable phase shifter unit is "$p$" radians per volt, where "$p$" is a constant, then the voltage difference between adjacent columns and rows, respectively, will be:

$$\Delta V_x = \frac{2\pi Sx}{p\lambda} \sin \theta \sin \phi$$

and $$\Delta V_y = \frac{2\pi Sy}{p\lambda} \sin \theta \cos \phi$$

For an antenna array having $2n+1$ columns (in the $x$-coordinate direction), the total voltage at the end columns of the array will, if the arrangement is similar to that of FIG. 7, be $+n\Delta V_x$ at one end of the $x$-string of resistors 223–227, etc., inclusive, and $-n\Delta V_x$ at the other end. Similarly, for $2m+1$ rows of antenna elements (in the $y$-coordinate direction), the voltages at the ends of the $y$-string of resistors 243–246, etc., inclusive, will be $+m\Delta V_y$ and $-m\Delta V_y$, respectively. The total voltage across the $x$-string of resistors, then, is $n\Delta V_x = K \sin \theta \sin \phi$, so that $$K = \frac{2\pi}{p\lambda}$$

Similarly $m\Delta V_y = K \sin \theta \cos \phi$, where $$K = \frac{2\pi}{p\lambda}$$

The arrangement of FIG. 12 is incorporated in a complete antenna system array over lines from a power divider (not shown) as represented by a line 263 and to antenna elements (not shown) over lines represented by one line 264. Of course, a frequency multiplier is also employed in the antenna line 264, and if desired an amplifier, as taught above in connection with FIG. 7.

While the invention has been described in connection with "antenna elements" and "antenna arrays," other forms of wave radiating elements are contemplated as transducers in accordance with the invention.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Electric wave phase control system comprising: means to provide an electric wave at a first frequency, means to divide said wave into at least two components of like phase, a phase shifter for each component adjustable to shift the phase of said component a desired amount and having input and output terminals, means to apply each of said components to the input terminals of one of said phase shifters, a plurality of harmonic generator means to generate the $n$th harmonic frequency of each of said components where "$n$" is an integer, means coupling the output terminals of each of said phase shifters to one of said harmonic generator means, whereby to provide the $n$th harmonic frequency of each of said components with a phase shift proportional to the phase shift of the respective one of said first frequency components, a plurality of amplifier means for electric wave energy at said harmonic frequency, wave radiating means operative at said harmonic frequency, means to apply the output from each of said harmonic generator means to one of said amplifier means, and means to apply the output of each of said amplifier means to one of said wave radiating means.

2. A steerable directional antenna array system comprising: an array of antenna units, means to provide separate first signals of like frequency and phase for each of said units, means coupled to each of said units to multiply the frequency of said first signal therefor and thereby to provide a second higher-frequency signal to said unit, and means to impose a separately-controllable phase shift upon each of said first signals prior to frequency multiplication thereof.

3. A steerable directional antenna array system comprising: an array of antenna units, means to provide separate first signals of like frequency and phase for each of said units, means coupled to each of said units to multiply the frequency of said first signal therefor and thereby to provide a second higher-frequency signal to said unit, and a controllable phase shift means coupled between said first signal means and each of said frequency multiplying means, to impose a separately-controllable phase shift upon each of said first signals prior to frequency multiplication thereof.

4. Antenna array according to claim 3 in which each of said phase shift means provide a phase shift in the first signal applied thereto in accordance with the magnitude of an electrical quantity applied thereto, and including means separately to adjust the magnitude of said quantity at each of said phase shift means in accordance with a prescribed pattern, whereby to control the directivity of said array.

5. Antenna array according to claim 4 including potential divider resistor means for establishing said pattern.

6. Antenna array according to claim 5 including means to provide a voltage across said potential divider which can be continuously varied in magnitude, whereby to scan the directivity of said array.

7. Antenna array according to claim 5 including means to provide a voltage across said potential divider which can be continuously varied in magnitude and alternated in sense, whereby to scan the directivity of said array.

8. Two-dimensional steerable directional antenna array system comprising: a plurality of individual antenna units disposed in a two-dimensional array, means adapting said array to have directivity in first and second orthogonally related planes intersecting said array, means to provide separate first signals of like frequency and phase for each of said units, means coupled to each of said units to multiply the frequency of said separate signal therefor and thereby to provide a second higher-frequency signal to said unit, and means to impose a separately-controllable phase shift upon each of said first signals prior to frequency multiplication thereof, the respective magnitudes and senses of said phase shifts being selected to control the directivity of said array.

9. Electric wave phase control system comprising: a plurality of wave radiating elements, a separate chain comprised essentially of an electric wave phase shifter followed by an electric wave frequency multiplier coupled via the output of the multiplier to each radiating element, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency of said first frequency, where "$n$" is an integer, with a phase shift proportional to the phase shift of said first frequency wave due to the phase shifter preceding it in its chain, and means to provide a control signal to each of said phase shifters, said parameters being adjustable to provide a desired phase relationship between said harmonic frequency waves in said respective outputs of said harmonic generators.

10. Electric wave phase control system comprising: a plurality of individual antenna units arrayed to have directivity in at least one plane, a separate chain comprised essentially of an electric wave phase shifter followed by an electric wave frequency multiplier coupled via the multiplier output to each antenna unit, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency, where "$n$" is an integer, with a phase shift which is $n$ times the phase shift of said first frequency wave due to the phase shifter preceding it in its chain, and means to provide to said phase shifters control signals which determine the directivity of said antenna array.

11. Electric wave phase control system comprising: a plurality of individual antenna units arrayed to have directivity in at least one plane, a separate chain comprised essentially of an electric wave phase shifter followed by an electric wave frequency multiplier coupled via the multiplier output to each antenna unit, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency, where "$n$" is an integer, with a phase shift which is $n$ times the phase shift of said first frequency wave due to the phase shifter preceding it in its chain, means to provide to said phase shifters control signals which determine the directivity of said antenna array, and means to vary said signals to scan said directivity through said plane.

12. Electric wave phase control system comprising: a plurality of individual receiving antenna units arrayed to have directivity in at least one plane, a separate chain comprised essentially of an electric wave phase shifter followed by an electric wave frequency multiplier followed by electric wave mixer means coupled via the mixer means to each antenna unit so that the outputs of said frequency multiplier and said antenna unit are both, respectively, coupled as inputs to said mixer means, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency, where "$n$" is an integer, with a phase shift which is $n$ times the phase shift of said first frequency wave due to the phase shifter preceding it in its chain, means to provide to said phase shifters control signals which determine the directivity of said antenna array, means to vary said signals to scan said directivity through said plane and output means for deriving an intermediate frequency wave from each of said mixers.

13. Electric wave phase control system comprising: a plurality of individual transmitting antenna units arrayed to have directivity in at least one plane, a separate chain comprised essentially of an electric wave phase shifter followed by an electric wave frequency multiplier followed by a microwave amplifier coupled via the amplifier output to each antenna unit, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency below the microwave range to each of said phase shifters, each multiplier being adapted to provide through its output to the input of the following microwave amplifier an electric wave at the $n$th harmonic frequency, in the microwave frequency range, of said first frequency, where "$n$" is an integer, with a phase shift which is $n$ times the phase shift of said first frequency wave due to the phase shifter preceding it in its chain, and means to provide to said phase shifters control signals which determine the directivity of said antenna array.

14. Electric wave phase control system comprising: a plurality of individual antenna units disposed in a two-dimensional array to have directivity in first and second orthogonally related planes intersecting said array, a separate chain comprised essentially of first and second electric wave phase shifters in series followed by an electric wave frequency multiplier coupled via the multiplier output to each antenna unit, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency, where "$n$" is an integer, with a phase shift which is $n$ times the total phase shift of said first frequency wave due to the first frequency wave due to the first and second controllable phase shifters preceding it in its chain, means to provide to said first phase shifters control signals which determine the directivity of said antenna array in said first plane, and means to apply to said second phase shifters control signals which determine the directivity of said array in said second plane.

15. Electric wave phase control system comprising: a plurality of individual antenna units arrayed to have directivity in at least one direction, a separate chain comprised essentially of an electric wave phase shifter followed by an electric wave frequency multiplier coupled via the multiplier output of each antenna unit, each of said phase shifters being controllable to provide that an electric wave presented to it will be presented to the following multiplier shifted in phase by a prescribed amount in accordance with a parameter of a control signal provided to said phase shifter, means to provide an electric wave at a first frequency to each of said phase shifters, each multiplier being adapted to provide at its output an electric wave at the $n$th harmonic frequency of said first frequency, when "$n$" is an integer, with a phase shift which is $n$ times the phase shift of said first frequency wave due to the phase shifter preceding it in its chain, means to provide to said phase shifters control signals which determine the directivity of said antenna array, and means to vary said signals to scan said directivity in a predetermined pattern.

16. An electric wave phase control system according to claim 15 in which said antenna units are arrayed in a two-dimensional array.

17. A steerable directional antenna array system according to claim 2 in which said means to multiply the frequency is a harmonic generator using solid state nonlinear reactive devices as the harmonic generating elements and in which said means to impose a phase shift is a phase shifter using solid state nonlinear reactive devices as the phase shifting elements.

References Cited by the Examiner

UNITED STATES PATENTS

| | | |
|---|---|---|
| 2,140,130 | 12/1938 | Earp. |
| 2,831,190 | 4/1958 | Trinter. |
| 2,920,284 | 1/1960 | Beagles et al. _____ 331—45 X |
| 3,133,282 | 5/1964 | Rosen _____ 343—100.60 X |

FOREIGN PATENTS 119,219   11/1944   Australia.

CHESTER L. JUSTUS, *Primary Examiner.*

MAYNARD R. WILBUR, *Examiner.*

R. E. BERGER, *Assistant Examiner.*